(12) United States Patent
Dove

(10) Patent No.: US 7,781,721 B1
(45) Date of Patent: Aug. 24, 2010

(54) ACTIVE ELECTRO-OPTIC MISSILE WARNING SYSTEM

(75) Inventor: Webster Dove, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 11/436,495

(22) Filed: May 18, 2006

Related U.S. Application Data

(60) Provisional application No. 60/682,140, filed on May 18, 2005.

(51) Int. Cl.
*G06M 7/00* (2006.01)
*G01J 1/20* (2006.01)

(52) U.S. Cl. .................................. 250/221; 250/203.1

(58) Field of Classification Search .................. 250/221, 250/203.1–203.7, 227.12, 206; 702/75, 76; 356/4.01, 138, 4.07, 5.01
See application file for complete search history.

(56) References Cited

U.S. PATENT DOCUMENTS

| | | | | |
|---|---|---|---|---|
| 4,234,141 A | * | 11/1980 | Miller et al. | 244/3.13 |
| 4,757,450 A | * | 7/1988 | Etoh | 701/96 |
| 5,249,157 A | * | 9/1993 | Taylor | 340/903 |
| 5,715,044 A | * | 2/1998 | Hayes | 356/5.09 |
| 5,892,575 A | * | 4/1999 | Marino | 356/5.01 |
| 2004/0135992 A1 | * | 7/2004 | Munro | 356/4.01 |
| 2007/0034776 A1 | * | 2/2007 | Weber et al. | 250/206 |

FOREIGN PATENT DOCUMENTS

JP   2002099905   * 4/2002

* cited by examiner

*Primary Examiner*—Thanh X Luu
*Assistant Examiner*—Jennifer Bennett
(74) *Attorney, Agent, or Firm*—Bourque & Associates; Daniel J. Long

(57) ABSTRACT

A threat detection system and method protects an object of interest (such as, but not limited to, manned and unmanned aircrafts, vehicles, vessels, and buildings) from potential weapons (such as, but not limited to, a missile, an aircraft, a vehicle, a vessel, or the like). The threat detection system transmits a hi-powered, extremely short-pulsed non-directional laser signal. Because the pulse time of the laser signal is so short (a few tenths of a nanosecond), the laser signal is substantially only reflected off optics that are pointed or aimed at the object to be protected. The reflected laser signals are received by the threat detection system and are then compared with the transmitted laser signals to determined the direction, speed, distance and potentially identity of the potential weapon. Because the threat detection system is not based on movement alone, it is capable of detecting a potential weapon while in flight or prior to launch.

14 Claims, 3 Drawing Sheets

ACTIVE ELECTRO-OPTIC MISSILE WARNING SYSTEM

RELATED APPLICATION

This application is related to and claims priority from U.S. provisional Application No. 60/682,140 filed May 18, 2005 entitled Active Electro-Optic Missile Warning System which is incorporated fully herein by reference.

TECHNICAL FIELD

The present invention relates to a missile warning system and more particularly, relates to an active electro-optic missile warning and tracking system.

BACKGROUND INFORMATION

Existing solutions rely on detecting and tracking the thermal signature of the missile, either from the propellant exhaust or the heating of the missile body.

When such methods rely on ultraviolet radiation, they can only detect and track the missile while the motor is in operation. This is a limiting capability with missiles that "burn-out" long before impact.

When such methods rely on infrared radiation, they can track both missile exhaust and body heating. However, there is an enormous amount of infrared clutter in most background scenes. This clutter places significant limitations on the ability to detect and track missiles using passive infrared radiation.

A need exists for a missile detection system and method that can accurately detect missiles even in a cluttered environment. The system and method should preferably be able to detect the location of missile. Moreover, the system and method should preferably be able to detect a missile prior to launch, not simply while in-flight.

Optical Augmentation is a recognized approach to detecting optical systems in a scene. The conventional method relies on the dramatically increased apparent cross section of an optical system when the source of illumination and detection are in the field of view of the optical system being sought.

This is the phenomenon responsible for the glow of cat's eyes at night and the red-eye apparent in photographic subjects when a direct flash is used.

A second less familiar phenomenon is the brevity of the impulse response of such an optical system. Because the incoming light is reflected off a single point in the focal plane, an incoming impulse of light is retro-reflected with small fractions of a nanosecond of response time. Virtually all other objects in the scene will have a much longer impulse response making the optics "stand-out" in time.

The combination of these two phenomena can be used to implement a very effective approach to electro-optic missile warning.

SUMMARY

A threat detection system, according to one embodiment of the present invention, is capable of detecting a potential weapon during flight or prior to launch. The threat detection system includes a laser energy source that generates a laser energy pulse. The oscillator modulates the laser source to generate a laser energy signal having a predetermined frequency and pulse time. Each pulse is short enough (a few tenths of a nanosecond) such that the laser energy signal reflected off an optical system can be readily distinguished from one reflected off other objects in the scene. The receiving system creates an image of the received reflections from the scene. Threat systems that use optical systems will exhibit three concurrent features. First, the pulses from those systems will be very short in time (a few tenths of a nanosecond). Second, these pulses will be very large in magnitude compared to the light returning from adjacent areas in the scene. Third, the light from threat systems will occupy a very small portion of the scene (typically less than one pixel). The receiving system looks for some combination of these three features (short time, high relative magnitude, small size) to distinguish electro-optic threats from other objects.

Optionally, the threat detection system includes a plurality of oscillators such that a plurality of different frequencies and/or pulse times can be generated to distinguish between returns that occur between two pulses and those that take longer than one repetition interval to return.

An emitter (preferably a wide-angle lens) is coupled to the oscillator and transmits the laser signal non-directionally. Optionally, the threat detection system includes a plurality of emitters disposed proximate an outer surface of the object to be protected in order to provide an adequate emission coverage pattern. A receiver is arranged to receive laser energy signal transmitted by the emitter that has reflected off an optic of a potential weapon. A comparator then analyzes the reflected laser signal in synchrony with the transmitted laser signal to determine a direction, a distance, and a speed of the potential weapon or targeting system.

It is important to note that the present invention is not intended to be limited to a system or method which must satisfy one or more of any stated or implied objects or features of the invention. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
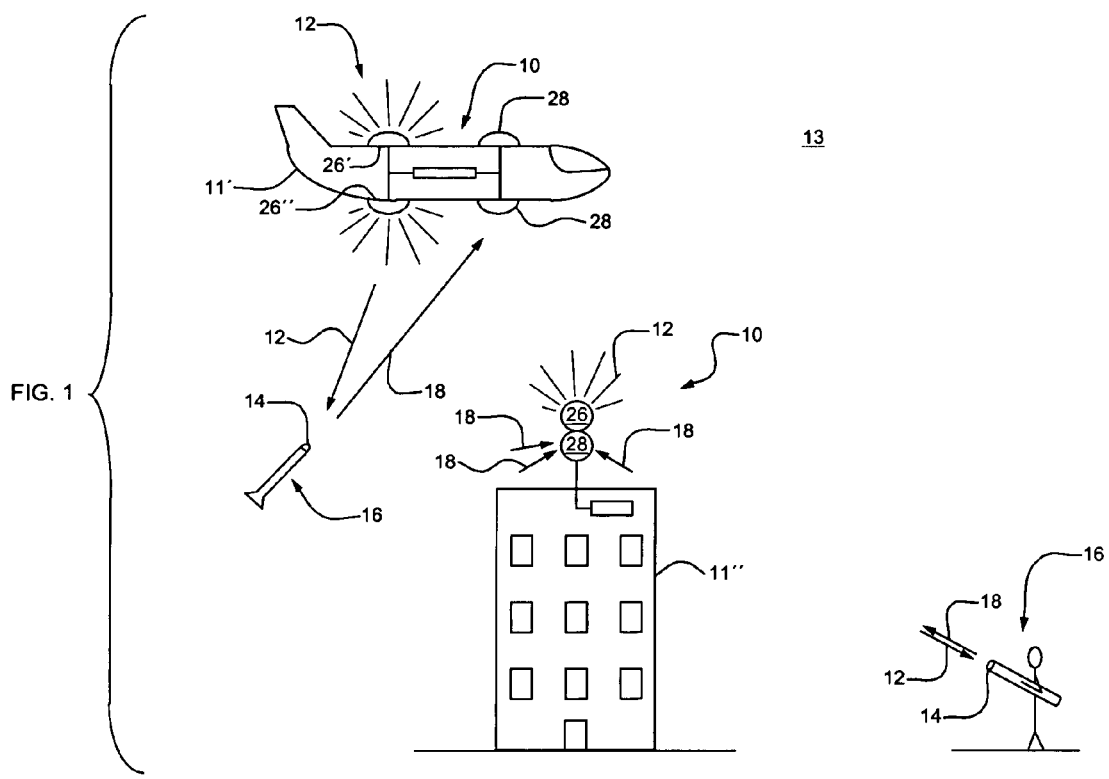
FIG. 1 is plan view of one embodiment of the threat detection system in combination with several types of objects to be protected.
Figure 3:
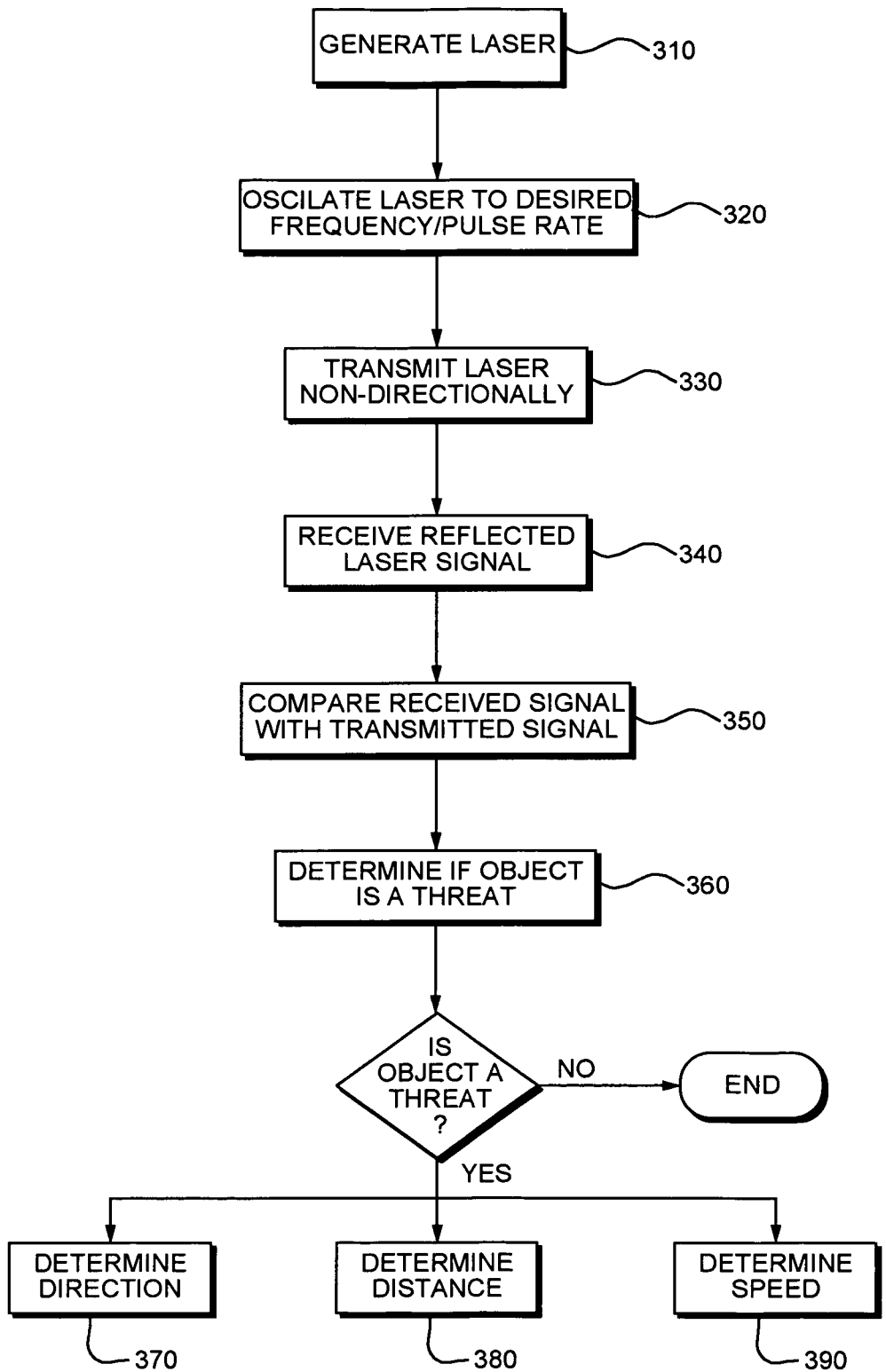
FIG. 3 is a flow chart illustrating one embodiment of the threat detection method according to the present invention.

A threat warning or detection system 10, FIG. 1, and method 300, FIG. 3, according to one embodiment of the present invention, detects the presence of a potential weapons 16, FIG. 1, (such as, but not limited to, a missile, an aircraft, a vehicle, a vessel, or the like) within a coverage area 13 around an object 11 of interest (such as, but not limited to, manned and unmanned aircrafts, vehicles, vessels, and buildings). The threat detection system 10 transmits a non-directional laser signal 12 that is capable of detecting a potential weapon 16 that is pointed or aimed at the object 11 to be protected while in flight or prior to launch.

The threat detection system 10, according to one embodiment of the present invention, takes advantage of the fact that modern potential weapons 16 include highly sophisticated optic systems 14 used to guide the potential weapon 16 and recognizes that extremely short (fraction of a nanosecond) laser pulses 12 reflect very well off the optics 14 of potential weapon 16 that are pointed or aimed at the source 11 of the laser pulse 12 as will be explained in greater detailed hereinbelow. Consequently, the threat detection system 10 is not limited to detecting potential weapons 16 only in-flight, but rather is also capable of detecting optics 14 of potential weapons 16 that are aimed at an object to be protected 11 prior to the potential weapon 16 being launched.

Figure 2:
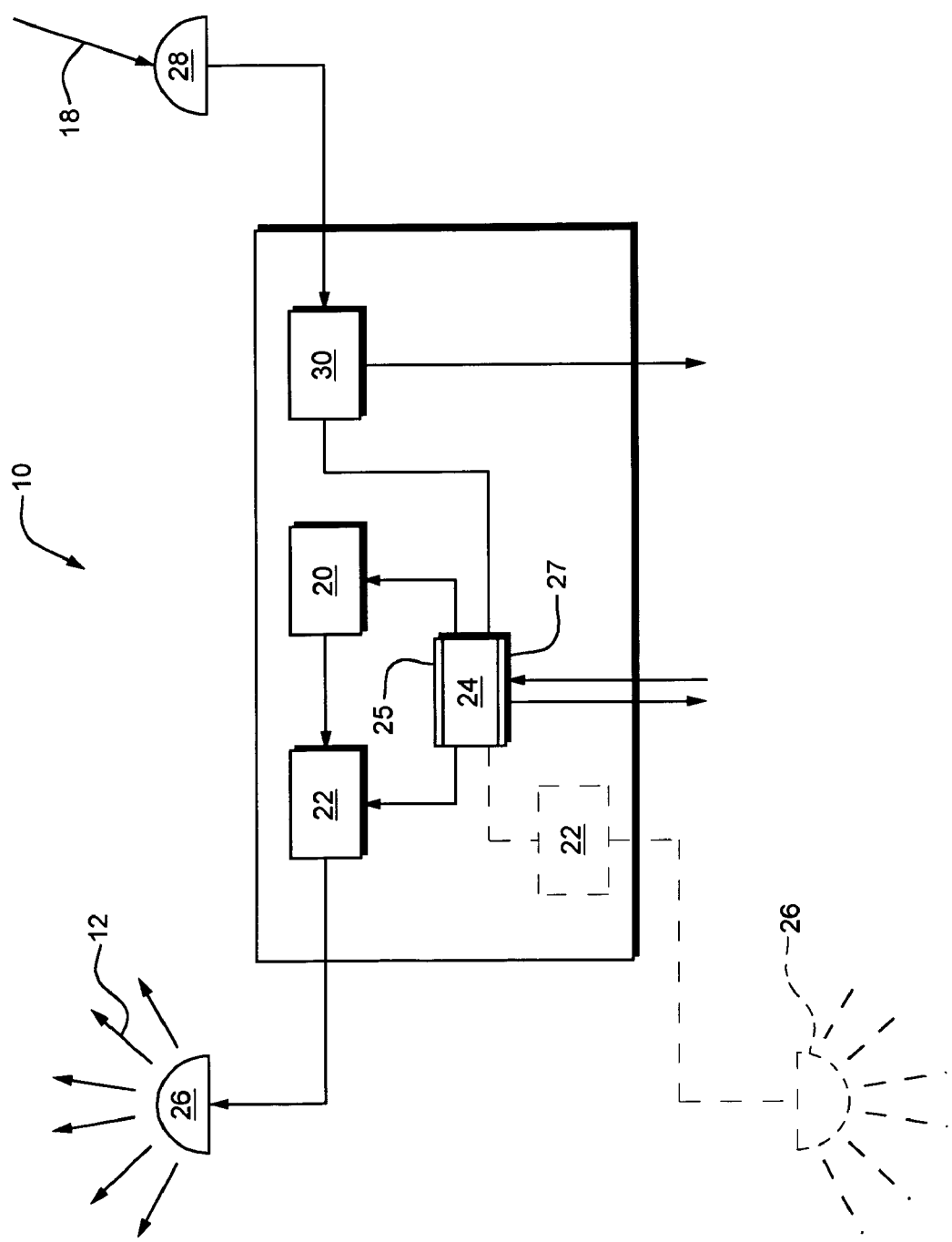
FIG. 2 is a schematic view of another embodiment of the threat detection system according to the present invention.

The threat detection system 10, FIG. 2, includes at least one laser energy source or generator 20, at least one oscillator 22, and at least one controller 24. The laser source 20 generates a high-powered laser, act 310, and is coupled to at least one oscillator 22. The oscillator 22 modulates the laser energy generated by the laser source 20 to the desired frequency and pulse time, act 320. The oscillator frequency may range from as low as a few Hz to as high as several hundred kilo-Hz. The pulses may range from a significant fraction of a joule at low pulse rates to a milli-joule at high rates. The tradeoff being driven by the availability of LASER sources and the anticipated distance to and cross-sections of the targets.

The length or time of the pulse must be short enough such that the threat detection system 10 can differentiate and distinguish between optics 14 and other objects or background clutter. The exact pulse time of the laser signal 12 will depend upon the specific types of missiles 14 that the threat detection system 10 is intended to detect, and is within the ordinary knowledge of one skilled in the art and can be determined without undue experimentation. While not a limitation of the present invention, a pulse time of a few tenths of a nanosecond is believed to be sufficiently short to enable the threat detection system 10 to differentiate and distinguish between the optics 14 of most potential weapons 16 and other objects or background clutter.

The controller 24 is coupled to both the laser energy source 20 and oscillator 22. The controller 24 activates the laser source 20, determines the intensity of the resulting laser signal 12, as well as activates a countermeasure system (not shown) or otherwise provides notification of a potential threat 16. The controller 24 also regulates the oscillator 22 to generate the laser signal 12 having a specific frequency or frequency range. Additionally, the controller 24 includes memory 25 and an internal clock 27 that stores information pertaining to the pulsed laser signal 12 such as, but not limited to, the time of the pulse, the frequency, length of the pulse, and intensity. As will be discussed hereinbelow, this information is compared with received signals 18.

The output of the oscillator 22 is coupled to a transmitter 26 such as an emitter or lens (for example, a fisheye or wide-angle lens). The emitter 26 transmits the pulsed laser signal 12 non-directionally. As used herein, the term non-directionally is intended to denote that the pulsed laser signal 12 is not aimed directly at a specific object. The exact coverage pattern and number of emitters 26 will depend upon the circumstances of the installation.

For illustrative purposes only, an aircraft 11' (FIG. 1) may include two, 180 degree hemispherical emitters 26, a first emitter 26' disposed about an upper surface of the aircraft 11' and a second emitter 26" disposed about a lower surface of the aircraft 11'. This arrangement of emitters 26 is believed to provide the aircraft 11' with an approximately 360 degree, spherical coverage pattern. In contrast, a single, generally spherical emitter 26 may be sufficient when used to protect a building 11" where it is unlikely that 360-degree, spherical coverage would be needed. It is important to note that other arrangements of emitters 26, oscillators 22, and laser generators 20 are envisioned and are within the scope of the present invention.

The transmitted, pulsed laser signal 12 travels until it reaches the optics 14 of a potential weapon 16 that is pointed at the object 11 to be protected or until it dissipates. The threat detection system 10 takes advantage of the fact that the optics 14 of potential weapons 16 are designed to precisely focus light coming from the object to be protected onto the threat imaging system focal plane. Because the pulsed laser signal 12 is extremely short, only optics 14 that are pointed at the object 11 to be protected will reflect the pulsed signal 12 back towards the object 11 to be protected. All that is necessary is for the object to be protected to be in the field-of-view of the threat sensor, which is always true for any threat. Other objects, such as background clutter and the like, will reflect the light across a distributed surface so the result is spread out in time unlike the short-time retro-reflection from an imaging system.

The reflected signal 18 is then received by the receiver 28, act 340, of the threat detection system 10. It should be noted that the threat detection system 10 may include one or more receivers 28.

The received signal 18 is then compared with the transmitted signal 12, act 350, by the comparer 30. Using focal plane detection techniques, the comparer 30 analyzes the spatial distribution and optical data or characteristics (such as, but not limited to, the time of the received signal 18, the frequency, length of the pulse, and intensity) of the received signal 18 with the characteristics of the transmitted signal 12 stored in the memory 25 of the controller 24. Based on this comparison, the comparer 30 determines if the received signal 18 is that of a potential weapon 16 or background clutter, act 360, and determines the direction of the potential weapon 16 (act 370), the distance of the potential weapon 16 (act 380), and the rate of closure of the potential weapon 16 (act 390). With sufficiently rapid sampling of the impulse response of the threat optical system, it is also possible to match the optical time response to a database of signatures and thereby identify the type of threat.

Accordingly, the threat detection system 10 of the present invention is able to detect a potential weapon 16 not only while in flight, but also when the optics 14 of the potential weapon 16 are aimed at the object 11 to be protected prior to the launch of the potential weapon 16. As a result, countermeasure systems and methods/actions designed to protect the object 11 (for example, missile jamming systems and evasive maneuvers) can be activated sooner, thus increasing the likelihood that the potential weapon 16 will not hit the intended target.

Additionally, the threat detection system 10 transmits a non-directional pulse laser signal 12 and therefore provides a greater and more complete coverage pattern 13 than traditional systems that must scan or be otherwise aimed at a particular area. Because the threat detection system 10 does not include any externally moving parts (such as a rotating housing or the like), the overall maintenance of the threat detection system 10 is greatly reduced. Lastly, the overall size of the threat detection system 10 is significantly reduced, thereby allowing the threat detection system 10 to be installed more easily on a wide variety of object 11 to be protected.

As mentioned above, the present invention is not intended to be limited to a system or method which must satisfy one or more of and stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the following claims.

The invention claimed is:

1. A threat detection system for the detection of a potential weapon having an optic element with respect to an object to be protected, said threat detection system comprising:
   a laser energy source, said laser source for generating a laser beam in response to a laser energy source control signal;
   at least one oscillator, coupled to said laser energy source, said at least one oscillator responsive to an oscillator control signal and configured for modulating said laser beam to generate a laser signal to be transmitted toward at least a scene to be inspected for a potential weapon, said laser signal having a predetermined frequency and pulse time controlled by said at least one oscillator, wherein said pulse time is selected to be short enough to cause a reflection of said laser signal from an optic element of an optical guidance system of said potential weapon that is much greater than a reflection of said laser signal from other elements of the scene including said potential weapon;
   a controller, coupled to said laser energy source and to said at least one oscillator, and configured for providing said laser energy source control signal and said at least one oscillator control signal, said laser energy source control signal for activating the laser source, said at least one oscillator control signal for regulating the frequency of said at least one oscillator;
   an emitter, coupled to said oscillator, and configured for transmitting said generated laser signal non-directionally;
   a receiver, configured for receiving at least a portion of a laser signal transmitted by said emitter that has reflected off the optic element of said potential weapon; and
   a comparer, coupled to said receiver, and configured for analyzing and comparing said reflected laser signal with said transmitted laser signal to determine a direction, a distance, and a speed of said potential weapon with respect to said object to be protected, said comparer configured for identifying selected characteristics of said reflected laser signal, wherein said selected characteristics include two or more characteristics selected from the group of characteristics consisting of: reflected laser signal energy pulses having the shortest time duration; reflected laser signal energy pulses having a large magnitude compared to reflected laser signal energy pulses from adjacent areas in the scene; and reflected laser signal energy pulses occupying a very small portion of the scene.

2. The threat detection system as claimed in claim 1 wherein said emitter includes a wide-angle lens.

3. The threat detection system as claimed in claim 1 wherein said at least one oscillator includes a plurality of oscillators, wherein each of said plurality of oscillators is configured for generating a laser signal having a different frequency and pulse time from another of said plurality of oscillators.

4. The threat detection system as claimed in claim 1 wherein said emitter includes a plurality of emitters disposed proximate an exterior surface of said object to be protected.

5. The threat detection system as claimed in claim 1 wherein said at least one controller determines said frequency and said pulse time of said transmitted laser signal and stores data concerning said transmitted laser signal.

6. The threat detection system as claimed in claim 5 wherein said at least one controller is coupled to said comparer, and wherein said comparer analyzes said data concerning said transmitted laser signal stored in said controller with said reflected laser signal to determine said direction, said distance, and said speed of said potential weapon.

7. The threat detection system as claimed in claim 6 wherein said comparer uses focal plane detection techniques to determine said direction, said distance, and said speed of said potential weapon.

8. The threat detection system as claimed in claim 1 wherein said pulse time is a few tenths of a nanosecond.

9. A method of detecting a potential weapon having an optic element with respect to an object to be protected, said method comprising the acts of:
   generating a laser beam in response to a laser energy source control signal;
   modulating said laser beam to generate a laser signal having a predetermined frequency and pulse time, wherein said pulse time is selected to be short enough to cause a reflection of said laser signal from an optic element of an optical guidance system of a potential weapon that is much greater than a reflection of said laser signal from other elements of a scene irradiated with said laser signal;
   transmitting said laser signal non-directionally to at least said scene;
   receiving a reflected laser signal, wherein said reflected laser signal may include a portion of a laser signal transmitted by said emitter that has reflected off said optic element of said potential weapon;
   comparing a direction, speed and distance of said reflected laser signal with a direction speed and distance of said transmitted signal;
   determining a type of said potential weapon based on said comparison; and
   determining whether said potential weapon is a threat.

10. The method as claimed in claim 9 further including the act of storing data concerning said transmitted laser signal.

11. The method as claimed in claim 10 wherein said act of determining if said reflected signal is a potential weapon includes comparing said reflected laser signal with said data concerning said transmitted laser signal.

12. The method as claimed in claim 9 wherein said act of comparing said reflected laser signal with said data of said transmitted laser signal includes using focal plane detection techniques.

13. The method as claimed in claim 9 wherein said pulse time is a few tenths of a nanosecond.

14. A threat detection system for detecting a weapon comprising:
   means for generating a laser beam;
   means for modulating said laser beam to create a laser signal to be transmitted toward at least a scene to be inspected for a potential weapon, said laser signal having a predetermined frequency and pulse time, wherein said pulse time is selected to be short enough to cause a reflection of said laser signal from an optical component of an optic transceiver of a potential weapon that is much greater than a reflection from other elements of the scene;
   means for transmitting said laser signal non-directionally towards at least said scene;
   means for receiving a reflected laser signal, said reflected laser signal including at least said transmitted laser signal that has reflected off the optical component of a potential weapon; and
   means for comparing a direction, a speed and a distance of said reflected laser signal with a direction, a speed and a distance of said transmitted laser signal to determine if said potential weapon is a threat, wherein the comparer compares said reflected laser signal with said transmitted laser signal to determined a type of said potential weapon.

* * * * *